United States Patent [19]

Dickerson

[11] Patent Number: 4,541,575

[45] Date of Patent: Sep. 17, 1985

[54] WINDING TECHNIQUE FOR MULTIPLE WINDING BRUSHLESS MOTORS

[75] Inventor: Ray Dickerson, Christiansburg, Va.

[73] Assignee: Kollmorgen Technologies Corp., Dallas, Tex.

[21] Appl. No.: 417,939

[22] Filed: Sep. 14, 1982

[51] Int. Cl.[4] .......................... F16C 9/06; H02K 23/00
[52] U.S. Cl. .................................... 242/703; 310/166
[58] Field of Search ............ 310/166; 242/703, 1.1 R; 29/605

[56] References Cited

U.S. PATENT DOCUMENTS 3,621,311 11/1971 Starck ................................... 310/13

Primary Examiner—Billy S. Taylor
Attorney, Agent, or Firm—Morgan, Finnegan, Pine, Foley & Lee

[57] ABSTRACT

A method of winding brushless motors is disclosed. According to the method one turn of the winding is applied to each phase of a multi-phase motor, then, a second turn is applied to each of the phases, etc., until the required number of turns are wound. The method results in a layered winding having a minimum of end turned build-up and excellent inductance balance between phases of the winding. Because the winding for each phase is continuous, a high reliability winding is produced.

5 Claims, 1 Drawing Figure

4,541,575

WINDING TECHNIQUE FOR MULTIPLE WINDING BRUSHLESS MOTORS

BACKGROUND OF THE INVENTION

The present invention relates to methods of winding machines, and in particular, to a method of winding brushless machines.

In AC motors and brushless DC motors the stator winding typically carries multiphase AC current to generate a rotating magnetic field. The most common stator winding arrangement is a three-phase winding, although two-phase windings are common in control systems.

In practice, stator windings typically consist of one or more phases, with each phase consisting of a number of full pitch or fractional pitch coils having one or more turns. In a three-phase stator winding, or any multiphase stator winding, a separate winding is applied for each phase. Thus, for a two turn stator winding, each phase winding will have two turns.

For good motor performance it is desirable to have a good balance of inductance between the various phase windings. Having a good balance of inductance between phases reduces circulating currents in the windings and distributes power demand on the circuitry driving the motor so that the peak power rating of the motor is not limited by any one circuit driving more than its share of the load. Good balance of inductance also allows a net reduction in a motor's winding inductance, thereby allowing the motor to operate at a higher combination of speed and torque.

Currently, there are a number of methods used to wind the stators of brushless motors.

One method requires individual coils to be wound as a first step. The wound coils are then inserted into the slots of the stator core in a manner such that one side of each coil is first inserted all the way around the motor, after which the other side of the coil is inserted. The result is that one side of the coil is in the bottom of a slot while the other side is in the top of a slot. Thus, this winding method can result in a symmetrical winding with a good balance of inductance between phases. However, because the coils must be interconnected by time-consuming soldering or welding, the reliability of the winding is substantially reduced.

An alternative to this method is to continuously wind a series of continuous coils first, rather than a group of individual coils which must be interconnected later. The coils are then inserted into the slots of the stator. Although this winding method eliminates the need for interconnection, nevertheless, the difficulty of handling a string of interconnected coils remains. To simplify the handling of the coils, in practice one string of coils, i.e., one phase of a motor winding, is normally inserted into the stator slots first, with the second and subsequent strings of coils being inserted in sequence. The result is an unsymmetrical winding having inductance imbalance between the phases, and thus, poorer motor performance.

A third method is to hand wire the coils directly into the stator slots so that no interconnections have to be made. Under this method all of the turns for a given phase are wound at one time so that the winding of that phase is completed before another is started. The result again is an unsymmetrical stator winding having inductance imbalance.

SUMMARY OF THE INVENTION

Accordingly, it is a principal object of the present invention to provide a method of winding a brushless motor to produce a high reliability winding with an excellent balance of inductance between phases. Another object of the present invention is to provide a method of winding a brushless motor to produce a winding that has a high degree of reliability, yet which is economical to manufacture. A further object of the present invention is to provide a winding technique suitable for winding multiple phase and/or multiple winding brushless motors to produce a motor having a high reliability winding with an excellent balance of inductance between windings.

According to the present invention, a method of winding a multiple phase and/or multiple winding brushless motor is disclosed in which one turn is applied to each of the phase windings before subsequent turns are applied to any of the phases. After a turn has been applied to each of the phases, subsequent turns are applied in the same manner until the required number of turns are wound. The result is a layered winding with less end turn build-up and excellent inductance balance between phases. Since the winding applied to each of the phases is continuous, no interconnections are required between coils. The result is a high reliability winding that is economical to manufacture.

DESCRIPTION OF THE PREFERRED EMBODIMENT

Figure 1:
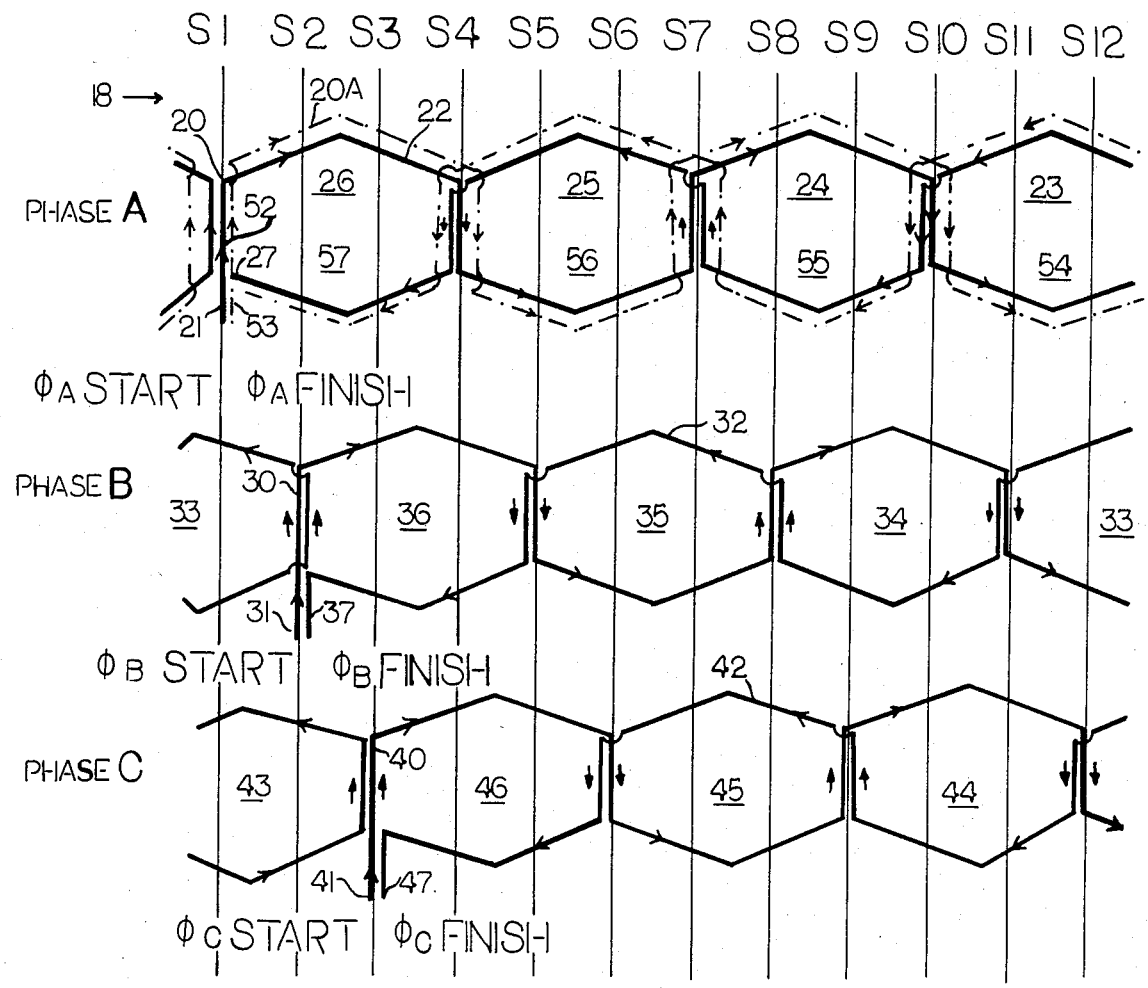
FIG. 1 is a drawing of a stator winding of a typical brushless motor using the winding method of the present invention.

FIG. 1 shows a stator winding for a three-phase (A, B and C), four pole brushless AC motor. The winding is applied to the motor's stator 18, which is shown as being linear for purposes of clarity. The core of the stator has twelve slots therein designated as S1 through S12. These slots are depicted as solid vertical lines, also for purposes of clarity.

The first turn for each phase is shown with solid lines, while a second turn for phase A is shown with dotted lines to distinguish it from the first turn. Each phase is comprised of four coils connected in series. The coils are full pitch coils, i.e., they span 180° in electrical measure. Thus, the winding pattern for each turn of a phase is identical to other turns.

The winding applied for each of the phases is shown separately for purposes of clarity. However, it is to be understood that in practice these windings would overlap at the end turns. According to the method of the invention a first turn of a phase winding is completely applied to one phase first. Beginning arbitrarily with phase A, a wire 20, beginning at point 21, is inserted into the bottom of slot S1 of stator 18. From slot S1 the wire is wound clockwise around stator 18 to a second slot S4, and inserted into the bottom thereof. The portion of wire 20 running between slots S1 and S4 is referred to as an end turn 22. Each time wire 20 is wound around the stator from one slot to another an additional end turn is produced. Because the end turns of a winding are not an active part of it, it is desirable to have them as short as possible.

From slot S4 the wire is then wound counter-clockwise around the stator to slot S7, and inserted into the bottom of this slot. From here it is again wound clockwise to slot S10, where it is inserted into the bottom of the slot. This winding procedure is then continued, except that at this point wire 20 is alternately wound counter-clockwise and clockwise back into the slots into which it was previously inserted. By back-tracking wire 20 through these slots, four series coils are wound. The first of these coils 23 is created by winding wire 20 back into slot S1 and inserting it therein. Thus, coil 23 has one side in slot S1, while its other side is in slot S10. The second coil 24 is created by winding wire 20 back into slot S10 so that coil 24 has one side in slot S10 and another side in slot S7. The third and fourth coils, 25 and 26, respectively, are similarly created, such that coil 25's sides are in slots S7 and S4, while coil 26's sides are in slots S4 and S1. Thus, it can be seen that each turn of a phase winding consists of four coils in series.

When wire 20 is finally brought to a temporary halt point 27, further winding of phase A is temporarily halted, and the winding of phase B started. It is important to note that although the winding of phase A is temporarily halted, wire 20 is not cut, but rather held to the side until it is used again.

For the winding of phase B a wire 30, beginning at point 31, is inserted into the bottom of slot S2. From slot S2 wire 30 is wound clockwise around stator 18 to slot S5, and inserted into the bottom thereof. From here it is wound counter-clockwise to slot S8, and inserted into the bottom of slot S8. As with phase A, as wire 30 is wound around the stator, end turns 32 running between the slots are generated. Again, it is desirable to keep these end turns as short as possible so that they are comparable in length to end turns 22 of phase A.

From slot S8 wire 30 is wound clockwise to slot S11 and inserted into the bottom thereof. At this point, as with the winding of phase A, wire 30 is then alternately wound counter-clockwise and clockwise back into the slots into which it was previously inserted, so as to create four series coils 33, 34, 35 and 36. Eventually, wire 30 is also wound to a temporary finish point 37, completing the first turn for the winding of phase B.

Upon completing this first turn, the winding for the first turn of phase C is started. For this phase, a wire 40, beginning at point 41, is inserted into the bottom of slot S3, after which it is alternately wound clockwise and counter-clockwise around stator 18 in a manner similar to the winding sequence used for wires 20 and 30. As wire 40 is wound around the stator it is inserted into the bottom of the slots associated with phase C (i.e., slots S3, S6, S9 and S12). At the same time end turns 42, comparable in length to end turns 22 and 32, are run between the slots. The clockwise and counter-clockwise winding of wire 40 also creates four series coils 43, 44, 45 and 46 which comprise the first turn of phase C. When wire 40 is finally brought to its temporary finish point 47, the first turn for this phase is complete, and the winding of phase C is also temporarily halted.

At this point, if a multi-turn stator winding is to be used, then the previous winding sequence would be repeated for each phase, with the first of the second turns being applied to phase A. To demonstrate the winding method of the present invention, a second turn for phase A is shown in FIG. 1 in dotted lines 20A. Because the stator winding shown uses full pitch coils, rather than partial pitch coils, the winding pattern for the second turn of phase A is the same as for the first turn thereof.

According to the method of the invention wire 20 is used again to wind the second turn. It is referred to as 20A for purposes of clarity. Thus, wire 20A is first wound clockwise along the stator from slot S1 to slot S4. Wire 20A is inserted into S1 so that it is lying on the portion 52 of wire 20 previously placed in slot S1. Wire 20A is shown as lying alongside wire 20 for purposes of clarity, however, it is to be understood that in practice this second turn would lie on top of the first turn in each of the slots.

From slot S4 wire 20A is again alternately wound counter-clockwise and clockwise around the stator into slots S7 and S10 and back to slot S1 until it is brought to another temporary finish point 53. According to the winding method four additional series coils, 54, 55, 56 and 57 coinciding with coils 23, 24, 25 and 26 are created. Because a continuous wire is used for the first and second turns, coils 54, 55, 56 and 57 are also in series with coils 23, 24, 25 and 26.

When wire 20A is finally brought to point 53, the second turn of phase A is complete, and the winding of the second turn of phase B is started. On its completion, the winding of the second turn of phase C would then be started.

The previously described winding method is much faster and simpler to wind than other winding techniques such as the conventional coil make-up method, particularly when the winding is comprised of a heavy gauge wire with a low number of turns. When smaller wire sizes and more turns are required, the technique may be applied using automatic winding equipment.

By using this winding technique it is possible to obtain a layered motor winding which has excellent inductance balance between phases. According to this method each number turn for each phase is essentially the same length. Further, the depth of each turn can be controlled so that there is consistency between phases for each number turn. It has been found that this is important for achieving a balanced inductance between phases because the inductance for each turn can be varied according to the depth of the turn within a slot and the amount of end-turn build-up.

Since the core of the stator is acting on the turns, the inductance of a turn will vary according to the depth of the turn in the slot. Thus, it is desirable to have each number turn for each phase at the same depth.

By using the winding method described herein it is also possible to minimize end turn build-up and to generate consistency in this build-up between phases. Again, for purposes of inductive balance between phases it is desirable for the build-up associated with each phase's winding to be essentially the same as the build-up for other phases. By winding one turn for each phase before a subsequent turn is placed on any phase, consistency in this build-up between phases can be achieved.

By producing a motor winding that is symmetrical between phases and that has no interconnections between turns a stator winding is produced which has a high degree of reliability and which provides better motor performance. Balancing the inductance between phases reduces the circulating currents between the phases and within the windings so as to reduce power losses in the motor and improve commutation. In addition, balancing the inductance distributes voltage and current stresses in the driving circuits more evenly so that the reliability of the motor at a given power level is improved. The result is a motor having a higher power rating for a given reliability rating.

The winding techinque described herein can also be used with alternators as well as motors. Reducing the net inductance of an alternator's windings allows a greater power output capacity because the inductance is a frequency dependent reactance which reduces generated voltage as speed increases. A balanced inductance produces a higher power rating because of the better sharing of current and voltage stresses in the circuits driving the alternator.

The above-described embodiment of the invention is illustrative, and modifications thereof may occur to those skilled in the art. The invention is not limited to the embodiment disclosed herein, but is to be limited only as defined by the appended claims.

What is claimed is:

1. A method of winding a multiple phase, multiple winding brushless machine comprising winding one turn of each of a plurality of phase windings before a subsequent turn is wound on any of said plurality of phase windings, and repeating said winding step for each subsequent turn of each of said plurality of phase windings until all turns are wound for all the phases.

2. A method of winding a multiple phase, multiple winding brushless machine comprising winding in a selected sequence one turn of each of a plurality of phase windings, repeating winding one turn of each of said plurality of phase windings using the same sequence as said one turn was wound until a selected number of turns are wound on all of said plurality of phase windings.

3. A method of winding a multiple phase, multiple winding brushless machine as recited in claim 2 wherein the machine is a three-phase machine, wherein said step of winding in sequence said one turn is comprised of winding one turn of a first phase winding first, then winding one turn of a second phase winding second, and winding one turn of a third phase winding third, and wherein said step of repeating winding one turn of each of the phase windings comprises repeating winding one turn of said first phase winding first, winding one turn of said second phase winding second, and winding one turn of said third phase winding third until said selected number of turns are wound for each of said three phase windings.

4. A method of winding a brushless machine as recited in claims 1, 2 or 3 wherein said steps of winding said one turn are comprised of winding said one turn with a continuous wire within each of said phase windings so that there are no interconnections between each of said turns comprising each of said phase windings.

5. A method of winding a brushless machine as recited in claim 4 wherein said steps of winding said one turn are comprised of winding a plurality of series coils into slots of the machine.

* * * * *